United States Patent
Wang

(10) Patent No.: US 11,637,579 B1
(45) Date of Patent: Apr. 25, 2023

(54) PROTECTIVE CASE FOR ELECTRONIC DEVICE

(71) Applicant: SHENZHEN XINYUEHE ELECTRONIC TECHNOLOGY CO., LTD, Shenzhen (CN)

(72) Inventor: Lei Wang, Wuhu (CN)

(73) Assignee: SHENZHEN XINYUEHE ELECTRONIC TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 18/085,718

(22) Filed: Dec. 21, 2022

(51) Int. Cl.
*H04B 1/3888* (2015.01)

(52) U.S. Cl.
CPC .................................. *H04B 1/3888* (2013.01)

(58) Field of Classification Search
CPC .. H04B 1/3888; H04B 1/0003; H04B 7/0434; H04B 7/0486; H04B 7/0617; H04B 7/0619
See application file for complete search history.

(56) References Cited

U.S. PATENT DOCUMENTS

| 10,219,598 B2 * | 3/2019 | Gronewoller ....... H04M 1/0258 |
| 2014/0268517 A1 * | 9/2014 | Moon ...................... H05K 7/00 361/679.01 |
| 2018/0013463 A1 * | 1/2018 | Jeon ........................ H04M 1/04 |

* cited by examiner

*Primary Examiner* — Fred A Casca
(74) *Attorney, Agent, or Firm* — Daniel M. Cohn; Howard M. Cohn

(57) ABSTRACT

A protective case for an electronic device includes a main case, an outer cover plate, an inner cover plate, a support, a support plate, and a handle. A front surface of the main case recesses to define an accommodating groove configured to accommodate the electronic device. A middle portion of a bottom surface of the accommodating groove is communicated with a middle portion of a rear surface of the main case to define a mounting groove. Elastic positioning beads are arranged on an inner wall of the mounting groove. By arranging the support plate and support in the receiving groove, the triangular support structure is formed when the support plate and the support are opened. By arrangements of the elastic positioning beads, a contact area between the outer cover plate and the mounting groove is reduced.

8 Claims, 3 Drawing Sheets

PROTECTIVE CASE FOR ELECTRONIC DEVICE

TECHNICAL FIELD

The present disclosure relates to a field of protective case technology, and in particular to a protective case for a phone or a tablet.

BACKGROUND

Phones or tablets are the most commonly used electronic devices. With widespread use of these electronic devices, more and more people focus on the protection of these electronic devices. In order to prevent the phones or the tablets from broken or bumping off the ground, a variety of protective cases are created. A conventional protective case is directly sleeved on a rear side of a phone or a tablet to protect the phone or the tablet, avoiding damage to the phone or tablet by external forces.

Common protective cases have a fixed structure that is directly connected with the phone or the tablet, so the tablet or phone can only be placed horizontally on a desk when in use, while a display screen of the phone or the tablet facing upward, which does not facilitate a user to view the display screen of the phone or tablet Specifically, the phone or tablet needs to be held by hand when in sue. If the user holds the tablet having a large size for a long time, maintaining a same posture makes the hand sore, thus a protective case having a support function is developed. In the market, there are many tablet protective cases having functions of rotating and supporting. However, a rotating piece of the tablet protective cases directly contact side walls of through holes of the tablet protective cases, making friction between them relatively large and causing serious material loss due to friction, thus making the tablet protective case not durable. In addition, the rotating piece is labored in the through holes, and the friction leads to unstable rotation thereof. Further, a support piece thereof is an arc-shaped piece, and a contact area of the support piece on the desk is relative small, resulting in unstable of the support piece when supporting. If the rotating piece is made to rotate easily, a gap for rotation needs to be defined between the rotating piece and the side walls of the through holes when manufacturing the tablet protective cases. The gap would cause the rotating piece to waggle, leading to inconvenience in use. Therefore, it is necessary to improve the conventional protective cases.

SUMMARY

In view of defects in the prior art, a purpose pf the present disclosure is to provide a protective case for a phone or a tablet, which effectively solves a problems that conventional protective cases are inconvenient to use.

To achieve the above purpose, the present disclosure provides a protective case for a phone or a tablet. The protective case comprises a main case, an outer cover plate, an inner cover plate, a support, a support plate, and a handle.

A front surface of the main case recesses to define an accommodating groove configured to accommodate the phone or the tablet. A middle portion of a bottom surface of the accommodating groove is communicated with a middle portion of a rear surface of the main case to define a mounting groove. The mounting groove is circular. Elastic positioning beads are arranged on an inner wall of the mounting groove.

The outer cover plate is circular. The outer cover plate is rotatably arranged on an outer side of the mounting groove. The outer cover plate covers the mounting groove. A plurality of positioning grooves matched and positioned with the elastic positioning beads is provided on an outer peripheral side of the outer cover plate. The plurality of positioning grooves is arranged at intervals in a circumferential direction of the outer cover plate. An outer surface of the outer cover plate recesses to define a receiving groove and two fixed holes. The two fixed holes are on two sides of the receiving groove.

The inner cover plate is circular. The inner cover plate is rotatably arranged on an inner side of the mounting groove and is arranged in the accommodating groove. The inner cover plate covers the mounting groove. The inner cover plate is fixedly connected with the outer cover plate and rotates along with the outer cover plate.

The support is hinged to the outer cover plate. The support is foldable and openable. In a folded state of the support, the support is matched with the receiving groove and is embedded in the receiving groove.

The support plate is hinged to a rear side of the support. The support plate is foldable and openable relative to the support. In a folded state of the support plate, the support plate is embedded in the receiving groove along with the support. In an open state of the support plate, the support plate and the support form a triangular support structure.

Two ends of the handle are one-to-one fixedly connected to the two fixed holes.

Optionally, the bottom surface of the accommodating groove is communicated with the rear surface of the main case to define a plurality of heat dissipating holes. The plurality of heat dissipating holes is arranged at intervals on a periphery of the accommodating groove.

Optionally, an inner side edge of the mounting groove recesses to define an inner embedding groove. The inner cover plate is embedded in the inner embedding groove.

Optionally, an outer side edge of the mounting groove recesses to define an outer embedding groove. The outer cover plate is embedded in the outer embedding groove.

Optionally, the inner cover plate defines a plurality of through holes. A plurality of screw holes is defined on an inner surface of the outer cover plate. The plurality of screw holes is one-to-one communicated with the plurality of through holes. A plurality of fixing screws separately passes through the plurality of through holes to screw with a corresponding screw hole.

Optionally, two elastic positioning beads are provided, and the two elastic positioning beads are symmetrically arranged in a radial direction of the protective case.

Optionally, the elastic positioning beads are made of metal.

Optionally, the handle is a VELCRO strap.

By arranging the support plate and support in the receiving groove, the triangular support structure is formed when the support plate and the support are opened. A bottom portion of the support fully contacts a desk, making a contact area large and making the support stably support the protective case when in use. By arrangements of the elastic positioning beads, a contact area between the outer cover plate and the mounting groove is reduced, making the outer cover plate labor-saving in rotation, reducing friction between the outer cover plate and the mounting groove, reducing material loss due to friction, and making the protective case durable. Moreover, the outer cover plate does not shake when rotating in the mounting groove even there is a gap between the outer cover plate and the mounting groove. Further, by setting the handle, the protective case is portable and is convenient to use, thus bringing more convenience for use.

10—main case; 11—acconnodating groove; 12—mounting groove; 13—elastic positioning bead; 14—heat dissipating hole; 15—inner embedding groove; 16—outer embedding groove; 20—outer cover plate; 21—positioning groove; 22—receiving groove; 23—fixed hole; 24—sliding groove; 25—clamping groove; 26—snap; 27—screw hole; 30—inner cover plate; 31—through hole 32—mounting hole; 40—support; 50—support plate; 51—snapping groove; 60—handle.

DETAILED DESCRIPTION

Figure 1:
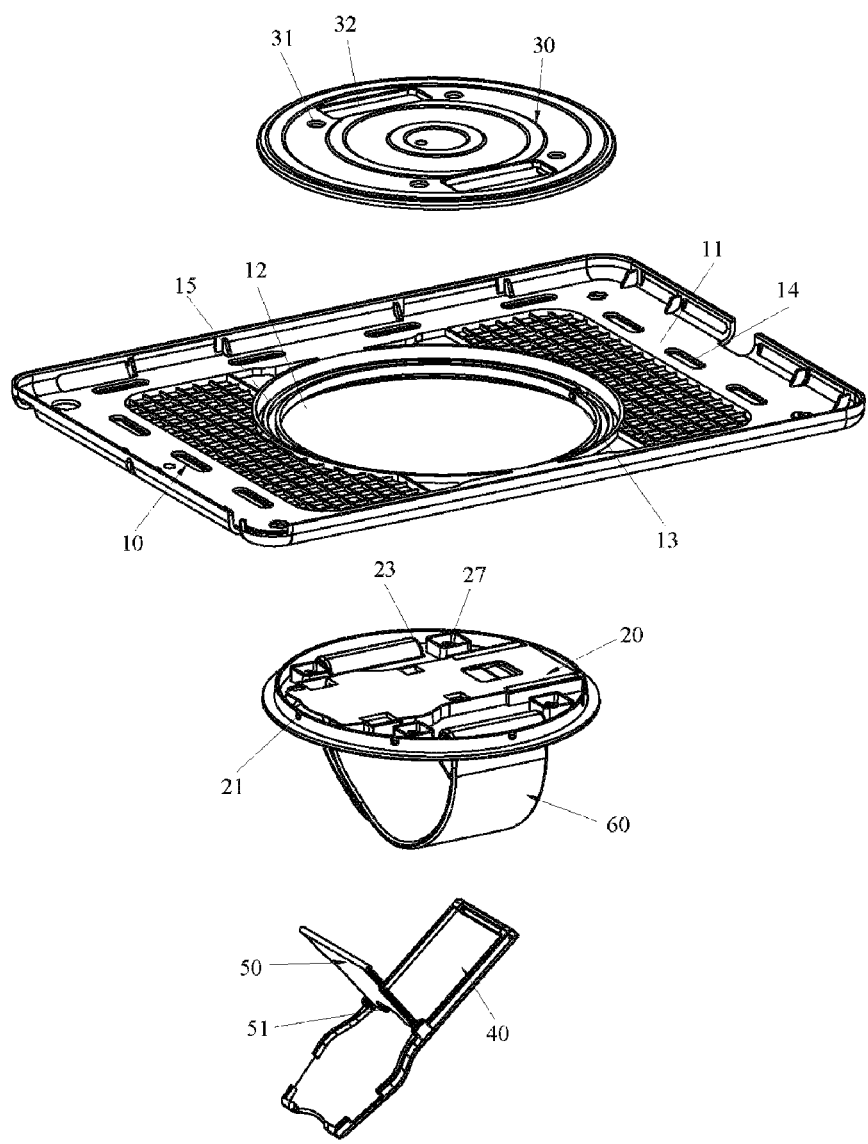
FIG. 1 is an exploded schematic diagram of a protective case according to one optional embodiment of the present disclosure.
Figure 2:
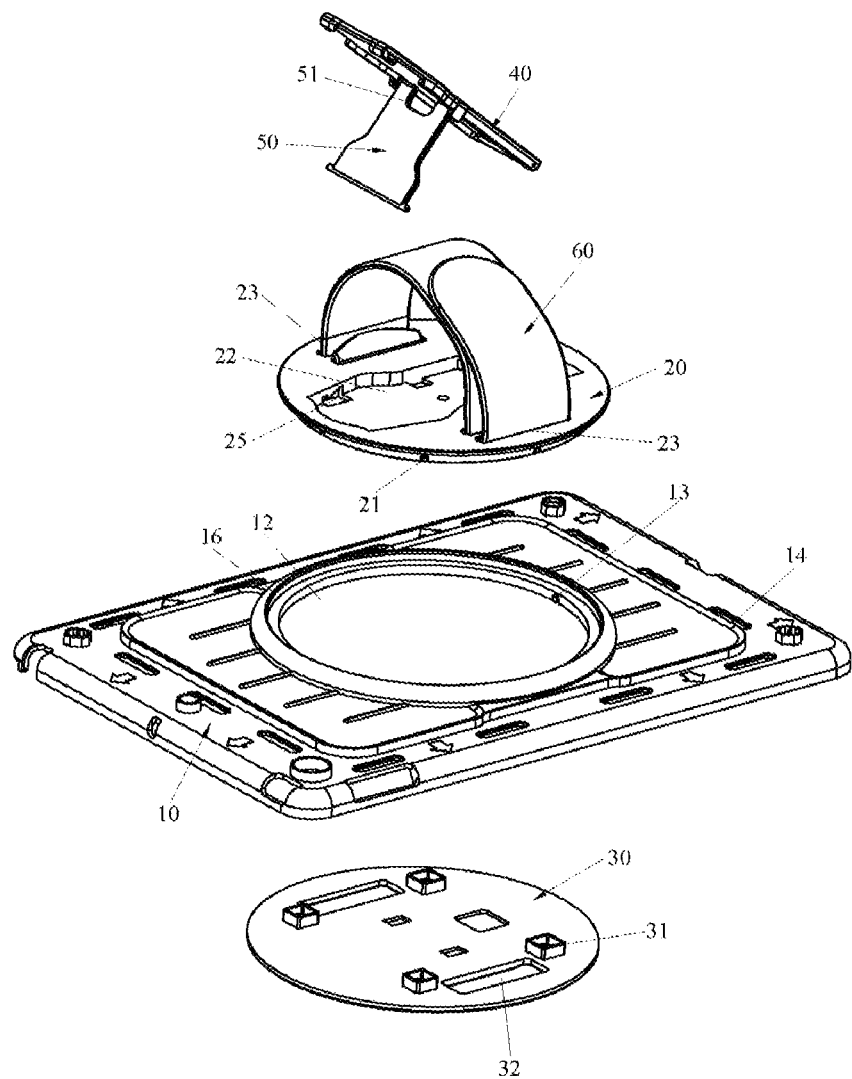
FIG. 2 is another exploded schematic diagram of the protective case according to one optional embodiment of the present disclosure.
Figure 3:
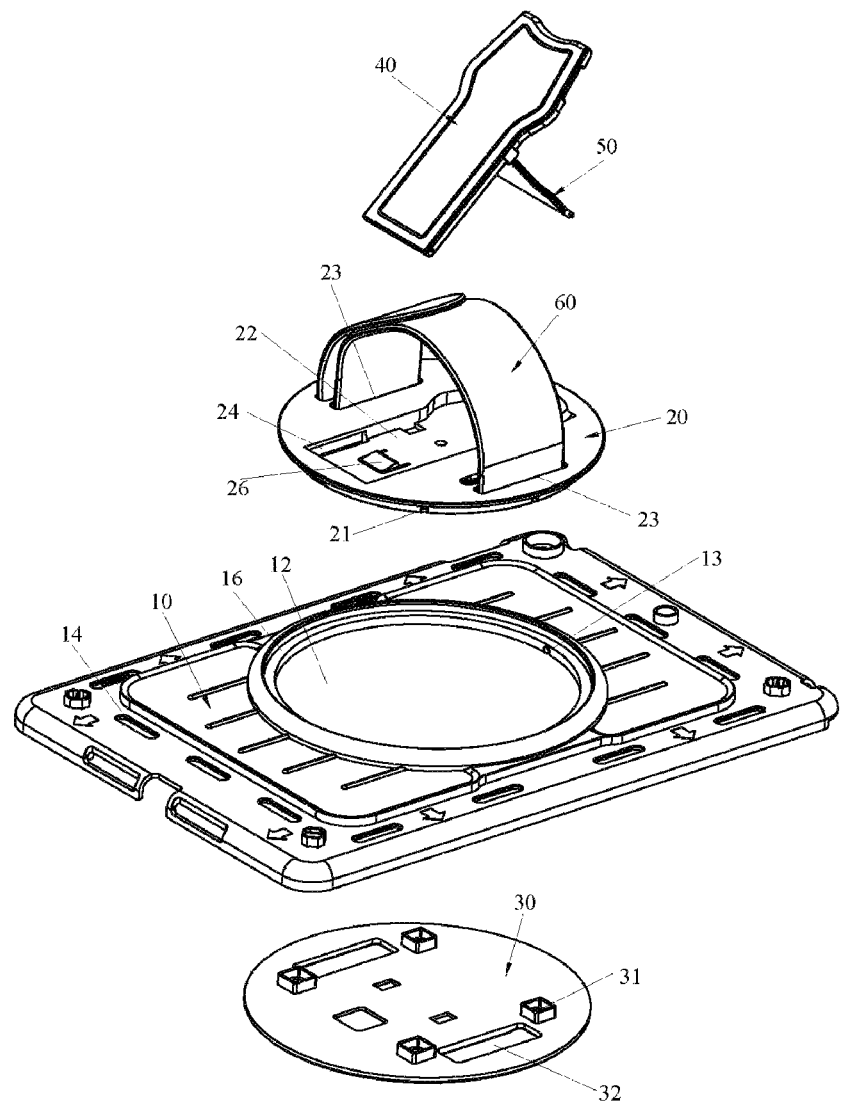
FIG. 3 is another exploded schematic diagram of the protective case according to one optional embodiment of the present disclosure.

FIGS. 1-3 show a specific structure of a protective case according to one optional embodiment of the present disclosure. The protective case comprises a main case 10, an outer cover plate 20, an inner cover plate 30, a support 40, a support plate 50, and a handle 60.

A front surface of the main case 10 recesses to define an accommodating groove 11 configured to accommodate a phone or a tablet. A middle portion of a bottom surface of the accommodating groove 11 is communicated with a middle portion of a rear surface of the main case 10 to define a mounting groove 12. The mounting groove 12 is circular. Elastic positioning beads 13 are arranged on an inner wall of the mounting groove 12.

In the embodiment, the bottom surface of the accommodating groove 11 is communicated with the rear surface of the main case 10 to define a plurality of heat dissipating holes 14. The plurality of heat dissipating holes 14 is arranged at intervals on a periphery of the accommodating groove 11 to dissipate heat generated by the phone or the tablet. Further, an inner side edge of the mounting groove 12 recesses to define an inner embedding groove 15. An outer side edge of the mounting groove 12 recessed to define an outer embedding groove 16. Specifically, two elastic positioning beads 13 are provided, and the two elastic positioning beads 13 are symmetrically arranged in a radial direction of the protective case. The elastic positioning beads 13 are made of metal.

The outer cover plate 20 is circular. The outer cover plate 20 is rotatably arranged on an outer side of the mounting groove 12. The outer cover plate 20 covers the mounting groove 12. A plurality of positioning grooves 21 matched and positioned with the elastic positioning beads 13 is provided on an outer peripheral side of the outer cover plate 20. The plurality of positioning grooves 21 is arranged at intervals in a circumferential direction of the outer cover plate 20.

The elastic positioning beads 13, which are configured to assist rotation and angular positioning of the outer cover plate 20, reduce a contact area between the outer cover plate 20 and an side wall of the mounting groove 12, reduce friction between the outer cover plate 20 and the side wall of the mounting groove 12, allow the outer cover plate 20 to rotate and position smoothly in a middle portion of the main case 10, and increase rotation comfort. Further, the elastic positioning beads 13 prevent the outer cover plate 20 from waggling in the mounting groove 12 due to a gap reserved when manufacturing the protective case, making the rotation of the outer cover plate stable and avoiding a problem that conventional rotating pieces do not rotate smoothly and are easily to woggle. An outer surface of the outer cover plate 20 recesses to define a receiving groove 22 and two fixed holes 23. The two fixed holes 23 are on two sides of the receiving groove 22.

In the embodiment, the outer cover plate 20 is embedded in the outer embedding groove 16. Sliding grooves 24 are provided on two sides of a first end of the receiving groove 22. Clamping grooves 25 are provided on two sides of a second end of the receiving groove. A middle portion of the receiving groove 22 protrudes outward to from a snap 26.

The inner cover plate 30 is circular. The inner cover plate 30 is rotatably arranged on an inner side of the mounting groove 12 and is arranged in the accommodating groove 11. The inner cover plate 30 covers the mounting groove 12. The inner cover plate 30 is fixedly connected with the outer cover plate 20 and rotates along with the outer cover plate 20.

In the embodiment, the inner cover plate 30 is embedded in the inner embedding groove 15. The inner cover plate 30 defines a plurality of through holes 31. A plurality of screw holes 27 is defined on an inner surface of the outer cover plate 20. The plurality of screw holes 27 is one-to-one communicated with the plurality of through holes 31. A plurality of fixing screws(not shown in the drawings) separately passes through the plurality of through holes 31 to screw with a corresponding screw hole 27. A direction mark is provided on a rear surface of the inner cover plate 30, and the direction mark is an arrow. A direction pointed by the arrow is an installation direction of the inner cover plate 30, making installation of the inner cover plate 30 clear. The inner cover plate 30 defines two mounting holes 32. The two mounting holes 32 directly face and match with the two fixed holes 23, which facilitate disassembly and assembly of the handle 60.

The support 40 is hinged to the outer cover plate 20. The support 40 is foldable and openable. In a folded state of the support 40, the support 40 is matched with the receiving groove 22 and is embedded in the receiving groove 22.

In the embodiment, an upper end of the support 40 is hinged to the sliding grooves through a shaft (not shown in the drawings). The support 40 is slidable along the sliding grooves.

The support plate 50 s hinged to a rear side of the support 40. The support plate 50 is foldable and openable relative to the support 40. In a folded state of the support plate, the support plate 50 is embedded in the receiving groove 22 along with the support 40. In an open state of the support plate, the support plate 50 and the support 40 form a triangular support structure.

In the embodiment, an upper end of the support plate 50 is hinged to the support 40. In the open state of the support plate 50, a lower end of the support plate 50 is clamped in the clamping grooves 25. The upper end of the support plate 50 defines a snapping groove 51. In the folded state of the support plate, the snap 26 snaps on the snapping groove 51, so that the support plate 50 is positioned in the receiving groove 22.

Two ends of the handle 60 are one-to-one fixedly connected to the two fixed holes 23. In the embodiment, the handle 60 is a VELCRO strap that is adjustable according to actual requirements to meet needs of different users.

The protective case of the present disclosure is used as follow.

When in use, the phone or the tablet is accommodated and fixed in the accommodating groove 11. In an initial state, the support 40 is folded relative to the support plate and the support plate 50 is folded in the receiving groove 22. At this time, a user can lift the handle 60 to carry the phone or the tablet. When the phone or the tablet needs to be supported on a desk, the support 40 is pulled out from the receiving groove 22, and the support plate 50 is opened relative to the support 40 to form the triangular support structure. Then the main case 10 is supported on the desk through the triangular support structure, so that the phone or the tablet is supported on the desk along with the main case 10. When an angle of the phone or the tablet needs to be adjusted, a certain force is applied to make the outer cover plate 20 to rotate arbitrarily within 360° to adjust the angle of the phone or the tablet. When a suitable angle is rotated, the elastic positioning beads 3 are stuck in the plurality of positioning grooves 21 to realize positioning of the outer cover plate 20.

In the present disclosure, by arranging the support plate and support in the receiving groove, the triangular support structure is formed when the support plate and the support are opened. A bottom portion of the support fully contacts the desk, making a contact area between the support and the desk large and making the support stably support the protective case when in use. By arrangements of the elastic positioning beads, a contact area between the outer cover plate and the mounting groove is reduced, making the outer cover plate labor-saving in rotation, reducing friction between the outer cover plate and the mounting groove, reducing material loss due to friction, and making the protective case durable. Moreover, the outer cover plate does not shake when rotating in the mounting groove even there is a gap between the outer cover plate and the mounting groove. Further, by setting the handle, the protective case is portable and is convenient to use, thus bringing more convenience for use.

The above specific embodiments of the present disclosure depict technical principles of the present disclosure. These descriptions are only for explaining the principles of the present disclosure, and cannot be interpreted as limiting of the protection scope of the present disclosure in any way. Based on the explanations, any modification, equivalent replacement, and improvement made within the spirit and principle of the disclosure, and other specific implementations of the present disclosure obtained by those skilled in the art without creative work, should fall within the protection scope of the present disclosure.

What is claimed is:

1. A protective case for an electronic device, comprising: a main case, an outer cover plate, an inner cover plate, a support, a support plate, and a handle;

wherein a front surface of the main case recesses to define an accommodating groove configured to accommodate the electronic device; a middle portion of a bottom surface of the accommodating groove is communicated with a middle portion of a rear surface of the main case to define a mounting groove; the mounting groove is circular; elastic positioning beads are arranged on an inner wall of the mounting groove;

wherein the outer cover plate is circular; the outer cover plate is rotatably arranged on an outer side of the mounting groove; the outer cover plate covers the mounting groove; a plurality of positioning grooves matched and positioned with the elastic positioning beads is provided on an outer peripheral side of the outer cover plate; the plurality of positioning grooves is arranged at intervals in a circumferential direction of the outer cover plate; an outer surface of the outer cover plate recesses to define a receiving groove and two fixed holes; the two fixed holes are on two sides of the receiving groove;

wherein the inner cover plate is circular; the inner cover plate is rotatably arranged on an inner side of the mounting groove and is arranged in the accommodating groove; the inner cover plate covers the mounting groove; the inner cover plate is fixedly connected with the outer cover plate and rotates along with the outer cover plate;

wherein the support is hinged to the outer cover plate; the support is foldable and openable; in a folded state of the support, the support is matched with the receiving groove and is embedded in the receiving groove;

wherein the support plate is hinged to a rear side of the support; the support plate is foldable and openable relative to the support; in a folded state of the support plate, the support plate is embedded in the receiving groove along with the support; and in an open state of the support plate, the support plate and the support form a triangular support structure; and wherein two ends of the handle are one-to-one fixedly connected to the two fixed holes.

2. The protective case for the electronic device according to claim 1, wherein the bottom surface of the accommodating groove is communicated with the rear surface of the main case to define a plurality of heat dissipating holes; the plurality of heat dissipating holes is arranged at intervals on a periphery of the accommodating groove.

3. The protective case for the electronic device according to claim 1, wherein an inner side edge of the mounting groove recesses to define an inner embedding groove; the inner cover plate is embedded in the inner embedding groove.

4. The protective case for the electronic device according to claim 1, wherein an outer side edge of the mounting groove recesses to define an outer embedding groove; the outer cover plate is embedded in the outer embedding groove.

5. The protective case for the electronic device according to claim 1, wherein the inner cover plate defines a plurality of through holes; a plurality of screw holes is defined on an inner surface of the outer cover plate; the plurality of screw holes is one-to-one communicated with the plurality of through holes; and a plurality of fixing screws separately passes through the plurality of through holes to screw with a corresponding screw hole.

6. The protective case for the electronic device according to claim 1, wherein two elastic positioning beads are provided, and the two elastic positioning beads are symmetrically arranged in a radial direction of the protective case.

7. The protective case for the electronic device according to claim 1, wherein the elastic positioning beads are made of metal.

8. The protective case for the electronic device according to claim 1, wherein the handle is a VELCRO strap.

* * * * *